United States Patent

McIntosh

[15] 3,691,553

[45] Sept. 12, 1972

[54] METHOD AND APPARATUS FOR DECODING DIGITAL INFORMATION

[72] Inventor: Duane E. McIntosh, Palmyra, Wis.

[73] Assignee: General Motors Corporation, Detroit, Mich.

[22] Filed: Dec. 1, 1970

[21] Appl. No.: 93,983

[52] U.S. Cl. .............340/347 DD, 178/68, 340/174.1

[51] Int. Cl. ..............................................H03k 13/24

[58] Field of Search ...........340/347, 174.1; 235/154; 78/66–68; 346/74 M

[56] References Cited

UNITED STATES PATENTS

| | | | |
|---|---|---|---|
| 3,537,082 | 10/1970 | Vallee | 340/347 X |
| 3,508,228 | 4/1970 | Bishop | 340/174.1 H |
| 3,493,962 | 2/1970 | Vallee | 340/347 |
| 3,448,445 | 6/1969 | Vallee | 340/347 |
| 3,452,348 | 6/1969 | Vallee | 340/347 |
| 3,374,475 | 3/1968 | Gabor | 340/174.1 H |
| 3,158,839 | 11/1964 | Anderson | 340/347 X |

*Primary Examiner*—Maynard R. Wilbur
*Assistant Examiner*—Charles D. Miller
*Attorney*—Eugene W. Christen, Creighton R. Meland and Albert F. Duke

[57] ABSTRACT

An apparatus and method is disclosed for constructing a non-return-to-zero bit stream from a coded bit stream containing transitions which occur at the boundary of a bit cell to represent a pair of "1's" and between the boundaries of a bit cell to represent a pair of "0's". Logic gate means determine which pair of like bits caused a transition in the coded bit stream by comparing the time of the transition with respect to bit cell time. The pairs of like bits so determined are stored in a shift register and the intervening data between the pairs of like bits is placed in the shift register with the sequence being determined by the number of bits between successive transitions and the pair of like bits which caused the second of the successive transitions in the coded bit stream.

7 Claims, 2 Drawing Figures

PATENTED SEP 12 1972 3,691,553

SHEET 1 OF 2

INVENTOR.

Duane E. McIntosh

BY

Albert F. Duke

ATTORNEY

PATENTED SEP 12 1972 3,691,553

SHEET 2 OF 2

INVENTOR.
Duane E. McIntosh
BY
Albert F. Duke
ATTORNEY

METHOD AND APPARATUS FOR DECODING DIGITAL INFORMATION

This invention relates to data processing and more particularly to an improved method and apparatus for decoding digital information.

It is a primary object of the present invention to provide a decoder for constructing a non-return-to-zero bit stream from a coded input bit stream having transitions which represent discrete pairs of bits. While not limited thereto, the invention is particularly useful in magnetic recording and reproducing systems for decoding a coded bit stream read from a magnetic medium in order to place the information in a more conventional form for subsequent processing.

The decoder of the present invention is particularly useful in decoding data which has previously been coded in accordance with the method disclosed in my copending application Ser. No. 94,032 filed concurrently herewith. In the copending application non-return-to-zero information is coded to produce an output bit stream containing transitions representing discrete pairs of bits in the non-return-to-zero bit stream. The output transition which occur at the beginning of a bit cell represent a pair of "1's" and the output transitions which occur between the boundaries of a bit cell represent a pair of "0's". In accordance with the present invention the coded bit stream is decoded by converting the coded bit stream to a transition pulse train containing pulses corresponding to the transitions. The transition pulse train is processed by logic circuitry to develop separate pulse trains containing pulses corresponding to the transitions representing pairs of "1's" and pairs of "0's" respectively. A shift register having a plurality of stages individually set by additional logic means responsive to the separate pulse trains constructs a simple non-return-to-zero bit stream containing the information of the coded bit stream.

Figure 1:
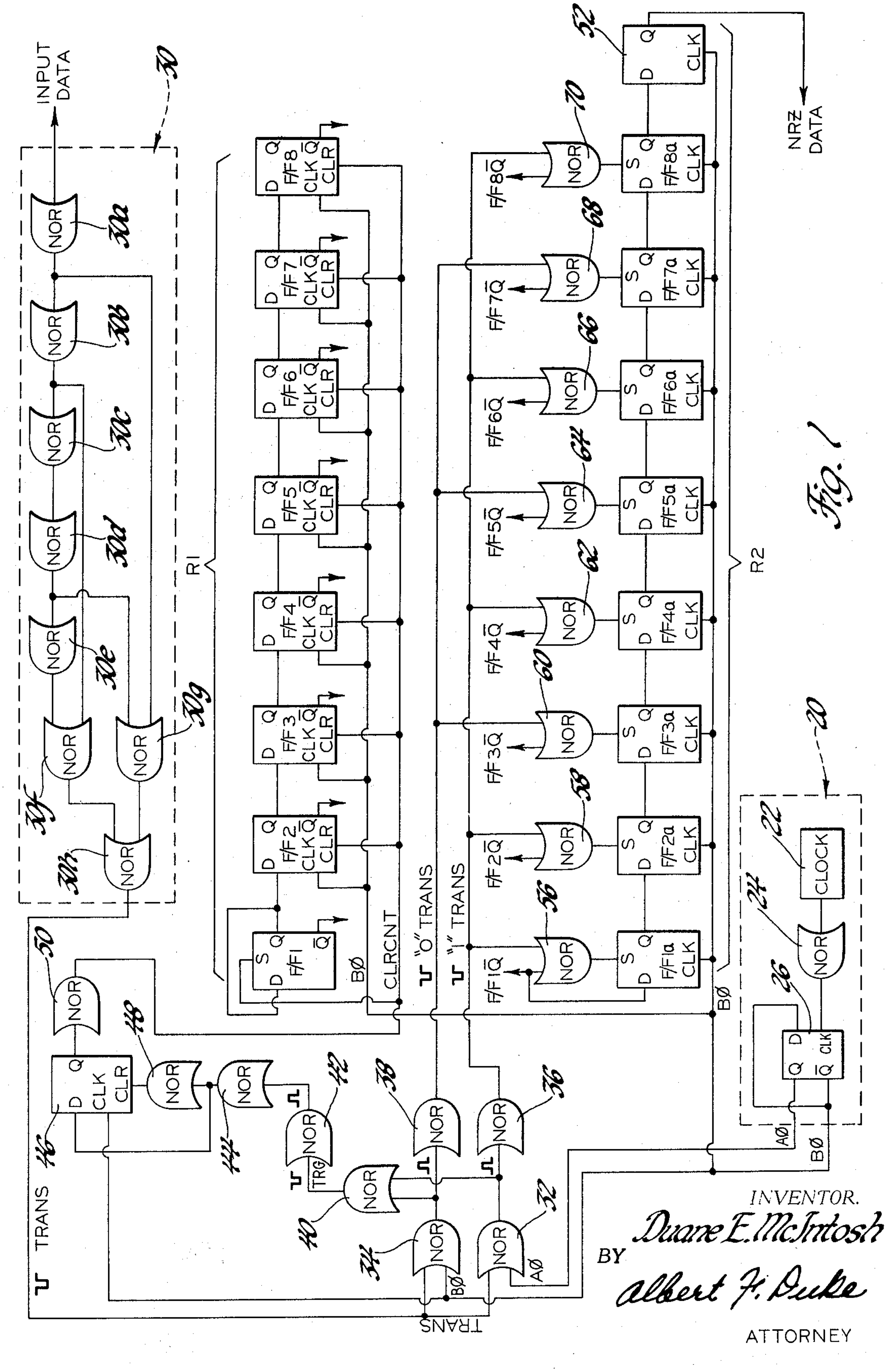
Figure 2:
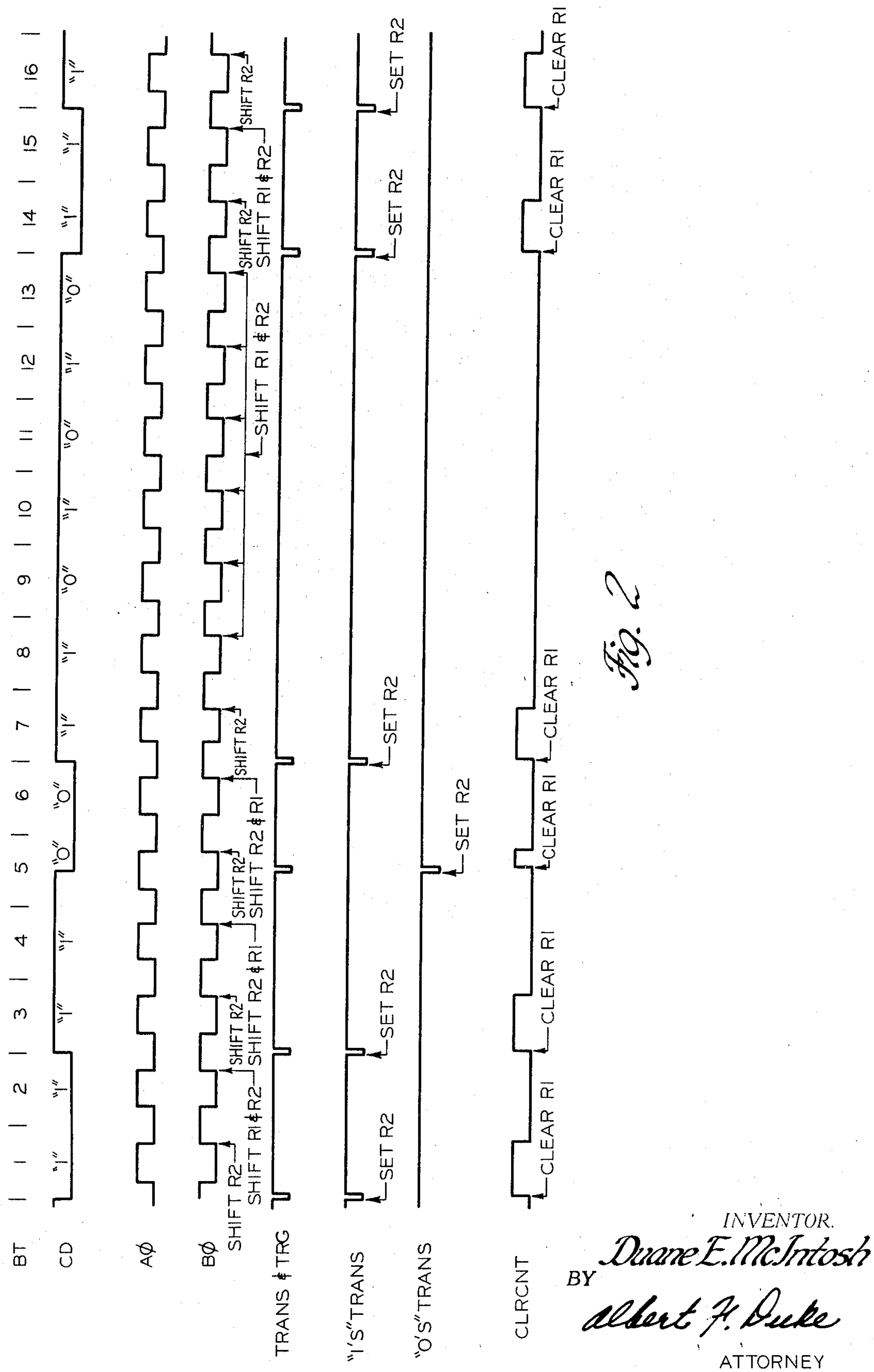

A more complete understanding of the present invention may be had from the following detailed description which should be read in conjunction with the drawings in which:

FIG. 1 is a schematic diagram of the preferred embodiment of the decoder constructed in accordance with the present invention; and FIG. 2 is a series of waveforms to aid in the explanation of the operation of the apparatus in FIG. 1.

Referring now to the drawings and initially to FIG. 1 a non-return-to-zero data clock generator is generally designated 20 and develops first and second timing pulse trains designated Aϕ and Bϕ which contains pulses occurring substantially at the boundaries of a bit cell and between the boundaries of a bit cell respectively. The clock generator 20 comprises a clock source 22 operating at a frequency of twice bit rate frequency which is synchronized and phase shifted with respect to transitions in the incoming data. The output of the clock 22 is fed through a NOR gate 24 which provides buffering and isolation and is applied to the clock input of a D type flip-flop 26. The flip-flop 26 transfers whatever logic level is present at the D input terminal to its Q output terminal on the leading edge of clock pulse. The $\overline{Q}$ and D terminals of flip-flop 26 are connected together. The outputs at the Q and $\overline{Q}$ terminals of the flip-flop 26 provide the Aϕ and Bϕ timing pulse at bit rate frequency with the Bϕ timing pulse train trailing the Aϕ/timing pulse train by 180°. The phase shift of the clock pulses previously referred to insures that the Aϕ and Bϕ timing pulse trains are at a logic "0" voltage level on either side of the boundary of a bit cell and on either side of the middle of a bit cell respectively as shown in FIG. 2.

The coded input data is applied to a dual edge triggered monostable multivibrator generally designated 30 which provides a transition pulse train, designated TRANS in FIG. 2, which includes pulses corresponding to transitions in the coded data, whether the transition is from an upper to a lower voltage level or from a lower to an upper voltage level. The multivibrator 30 includes a plurality of NOR gates *30a–30d*. The gate *30g* compares the inverted data output of gate *30a* with the data delayed by the intervening gates *30b* – *30d*. The gate *30f* compares the data delayed by gates *30a* and *30b* with the inverted data delayed by the gates *30a* – *30e*. The inputs to gates *30f* and *30g* will be at opposite logic levels except for a short interval of time when a transition occurs in the input coded data. The inputs to gate *30h* are therefore normally logic "0" except for these short intervals of time. Thus the output of gate *30h* is normally a logic "1" but switches to a logic "0" for a short interval of time each time a transition occurs in the coded data as shown in FIG. 2.

The TRANS pulse train output from the multivibrator 30 provides one input to NOR gates 32 and 34. The other inputs to the gates 32 and 34 are provided by Aϕ and Bϕ timing pulse trains respectively. Consequently the gates 32 and 34 separate the pulses from the output of the multivibrator 30 into those corresponding to a pair of "1's" and a pair of "0's" respectively. The outputs of the gates 32 and 34 are inverted by the NOR gates 36 and 38 respectively to produce a pulse train designated "1's" TRANS and "0's" TRANS respectively in FIG. 2. The pulses in the "1's" TRANS pulse train occur at the boundary of a bit cell whereas the pulses in the "0's" TRANS pulse train occur at the middle of a bit cell.

The outputs of the gates 32 and 34 provide inputs to a NOR gate 40 which provides a trigger pulse train which is essentially identical with the TRANS pulse train and is designated TRG in FIG. 2. The output of gate 40 is fed through NOR gates 42 and 44 to the D terminal of a flip-flop 46 and through an additional NOR gate 48 to the clear terminal of the flip-flop 46. The flip-flop 46 is clocked by the leading edge of pulses in the Bϕ timing pulse train. The voltage level at the D terminal of flip-flop 46 follows the TRG pulse train and accordingly, in the absence of a transition in the coded data is a logic "1". Likewise the voltage at the Q terminal of the flip-flop 46 is logic "1" and switches to a logic "0" only upon the application of a pulse to the clear terminal from the TRG pulse train. The Q terminal of flip-flop 46 remains at a logic "0" level for the interval defined by the width of the pulse from the TRG pulse train. The output at the Q terminal of flip-flop 46 is inverted by a NOR gate 50 and applied to a serial shift register generally designated R1. The output of the gate 50 is designated CLRCNT in FIG. 2.

The register R1 comprises a plurality of D type flip-flop stages 1–*n*. In the embodiment shown, $n = 8$ and the stages are designated F/F–1 through F/F–8. The function of the register R1 is to count the number of bit cells between transition in the coded data. The Q terminal of each of the stages F/F–1 through F/F–7 are connected to the D terminal of the following stage. Stage F/F–1 of register R1 is set by the leading edge of the CLRCNT pulses from gate 50 to maintain a logic "1" at the D terminal of F/F–2 and a logic "0" at the Q̄ terminal of F/F–1. Stages F/F–2 through F/F–8 of register R1 are shifted by the leading edge of pulses from Bϕ timing pulse train and are cleared to place a logic "0" on their respective Q terminals and a logic "1" on their respective Q̄ terminals by the leading edge of the CLRCNT output of gate 50. Because of the delay associated with the switching of flip-flop 46 and gate 50 the register R1 is maintained in a cleared condition during the rising edge of the Bϕ pulse occurring immediately following a transition. Thus the Q̄ output terminals of F/F–2 through F/F–8 will be shifted to a logic "0" in succession with the number of stages shifted depending on the number of bit cells between transitions in the coded data.

A second serial shift register generally designated R2 comprises a plurality of D type flip-flop stages 1–*n*. In the embodiment shown $n = 8$ and the stages are designated F/F–1*a* through F/F–8*a*. The output of the register R2 is applied to the D terminal of a flip-flop 52 which produces the NRZ data output at its Q terminal. The flip-flops F/F–1*a* through F/F–8*a* as well as the flip-flop 52 are shifted by the Bϕ timing pulse train. The stages F/F–1*a* through F/F–7*a* have their Q terminals connected with the D terminals of the succeeding stages. The D terminal of flip-flop F/F–1*a* is connected with the Q̄ terminal of the flip-flop F/F–1 of register R1 and is thus maintained at a logic "0" level. The stages F/F–1*a* through F/F–8*a* have their set terminals connected with NOR gates 56 – 70 respectively. The gates 56 through 70 have one input supplied from the Q̄ terminal of stages F/F–1 through F/F–8 respectively of the register R1. The other input to gates 56, 58, 62, 66 and 70 is connected with the output of gate 36. The other input to gates 60, 64, and 68 is connected with the output of gate 38. The gates 56, 58, 62, 66, and 68 set stages F/F–1*a* through F/F–3*a*, F/F–5*a* and F/F–7*a* to a logic "1" regardless of their previous state when a "1's" TRANS pulse is applied to their input along with a logic "0" from the Q̄ terminal of F/F–1 through F/F–3, F/F–5, and F/F–7 respectively of register R1. Similarly, gates 60, 64, and 68 set stages F/F–3*a*, F/F–5*a*, and F/F–7*a* to a logic "1" regardless of their previous state when a "0's" TRANS pulse is applied to their input along with a logic "0" from the Q̄ terminals of F/F–3, F/F–5, and F/F–7 respectively of register R1.

The operation of the decoder shown in FIG. 1 will now be described with reference to the waveforms shown in FIG. 2 wherein the coded input data, so designated, is shown to have transitions occurring at the boundaries of bit cells 1, 3, 7, 14 and 16 and occurring at the middle of bit cell 5. Thus the NRZ data is in the form 1111001101010111. The multivibrator 30 produces a pulse at the times indicated as a result of these transitions. Gates 32 and 36 detect and invert those pulses occurring at the boundary of a bit cell and produce the "1's" TRANS pulse train shown. The gates 34 and 38 detect and invert the pulses occurring in the transition pulse train at the middle of a bit cell to produce the "0's" TRANS pulse train shown.

The Q̄ terminals of F/F–1 and F/F–2 of register R1 are logic "0's" at the time the pulse from the "1" TRANS pulse train is received at the gates 56 and 58, thus setting the flip-flops F/F–1*a* and F/F–2*a* of register R2 to a logic "1" at the beginning of bit cell time (BT) 1. The TRG pulse to the clear terminal of flip-flop 46 switches the output of gate 50 to a logic "1" to clear the flip-flops F/F–2 through F/F–8 placing a logic "1" on the respective Q̄ terminals. The leading edge of the pulses in the Bϕ timing pulse train shift the register R2 during BT1 and BT2 so that at the beginning of BT3 the register R2 contains 0011 in the respective flip-flops F/F–1*a* through F/F–4*a*. The leading edges of the pulses in the Bϕ timing pulse train also shift the stages F/F–2 through F/F–8 of register R1. However, during BT1 the CLRCNT pulse is present at the clear terminals of flip-flops F/F–2 through F/F–8 due to the delays of flip-flop 46 and gate 50, so that the register R1 is not shifted during BT1. At the beginning of BT3 the "1's" TRANS pulse output of gate 36 sets flip-flops F/F–1*a* and F/F–2*a* of register R2 to a logic "1". The register R1 is cleared by the leading edge of the CLRCNT pulse. The register R2 is shifted by Bϕ timing pulses during BT3 and BT4 while the register R1 is shifted by Bϕ timing pulses during BT4 so that at the beginning of BT5 the register R2 contains 001111 in stages F/F–1*a* to F/F–6*a* respectively. The "0's" TRANS pulse occurring at the middle of BT5 does not affect the state of the register R2 since the gates 60 and 64 are disabled by a logic "1" appearing at the Q̄ terminals of F/F–3 and F/F–5 of register R1. The register R1 is cleared by the leading edge of the CLRCNT pulse immediately following the "0's" TRANS pulse and the register R2 is shifted by the leading edge of Bϕ pulses during BT5 and BT6 so that at the beginning of BT7 the register R2 contains 00001111 in stages F/F–1*a* through F/F–8*a*. At the beginning of BT7 the "1's" TRANS pulse sets F/F–1*a* and F/F–2*a* of register R2 to a logic "1". The register R2 is shifted during BT7 and BT8 so that at the beginning of BT9 the register R2 contains 00110011 in stages F/F–1*a* through F/F–8*a* respectively and the previous two bits of data "11" have been shifted out of the flip-flop 52. Since there are no transitions during BT9 through BT13; at the beginning of BT14 the register R1 contains 0000001 in the stages F/F–2 through F/F–8 respectively and the register R2 contains 00000001 in the stages F/F–1*a* through F/F–8*a* respectively. The NRZ data that has so far appeared at the Q terminal of flip-flop 52 is 1111001. When the "1" TRANS pulse occurs at the beginning of BT 14 the stages F/F–1*a*, F/F–2*a*, F/F–4*a*, and F/F–6*a* are set to a logic "1" since the gates 56, 58, 62, and 66 are enabled by the "0" appearing at the Q̄ terminals of F/F–1, F/F–2, F/F–4, and F/F–6 of register R1. The register R2 now contains 11010101 in the stages F/F–1*a* through F/F–8*a* respectively. The register R1 is cleared by the rising edge of the CLRCNT pulse in BT14 and the register R2 is once again shifted by the leading edge of the Bϕ timing pulses in BT14 and BT15. At the beginning of BT16 the "1's" TRANS pulse sets the stages F/F–1*a* and F/F–2*a* to a logic "1" and the register R2 is again shifted. Thus when the register R2 is shifted during BT16, the NRZ data which has appeared at the Q terminal of flip-flop 52 up to this point in time has been 1111001101 and it is apparent that the remaining decoded data will be shifted out in due course.

It will be understood from the above description that the respective pairs of "1's" and pairs of "0's" are detected and registered in the register R2 and that the intervening non-pairs between the transitions detected are registered in the register R1 under the control of the register R1 with the sequence of intervening non-pairs being determined by the state of the second of two successive pairs detected.

Having thus described my invention what I claim is:

1. A method of constructing an NRZ bit stream from a coded bit stream containing transitions occurring at one time in a bit cell to represent a discrete pair of bits and at a second time in a bit cell to represent the inverse of said discrete pair of bits comprising the steps of;

- comparing the time of a transition in said input bit stream with respect to bit cell time to ascertain the state of each bit in the discrete pair which cause the transition;
- registering the state of the bits in the discrete pair so ascertained;
- counting the number of bit cells between transitions and comparing the time of transition with respect to bit cell time, of the second of two successive transitions to ascertain the state of the intervening bits; and
- registering the state of the intervening bits so ascertained.

2. A method of constructing an NRZ bit stream from a coded bit stream containing a transition at the boundary of a bit cell representing a pair of "1's" and at the middle of a bit cell representing a pair of "0's" comprising the steps of;

- comparing the time of transition in said input bit stream with respect to bit cell time to ascertain the state of the pair which cause the transition;
- registering the state of the pair so ascertained;
- counting the number of bit cells between transitions and comparing the time of transition, with respect to bit cell time, of the second of two successive transitions to ascertain the state of the intervening bits; and
- registering the intervening bits so ascertained.

3. Apparatus for constructing a non-return-to-zero bit stream from an input bit stream containing transitions which occur substantially at the boundary of a bit cell to represent a pair of "1's" and between the boundaries of a bit cell to represent a pair of "0's" comprising;

- means responsive to said input bit stream for developing a first pulse train containing pulses corresponding to transitions in the input bit stream representing a pair of "1's" and for developing a second pulse train containing pulses corresponding to the transitions in said input bit stream representing a pair of "0's";
- shift register means containing *n* serially connected stages, the input to stage 1 of said register means being a logic "0";
- means for setting stages 1 and 2 to a logic "1" in response to a pulse in said first pulse train;
- means for setting certain stages in the sequence 4.6 . . . *n* and certain stages in the sequence 3.5 . . . n–1 to a logic "1" in response to a pulse in said first and second pulse trains respectively with the number of stages in the sequence being set depending on the number of bit cells between successive pulses in either of said first and second pulse trains.

4. Apparatus for constructing a non-return-to-zero bit stream from an input bit stream containing transitions which occur substantially at the boundary of a bit cell to represent a pair of bits both of one logic level and between the boundaries of a bit cell to represent a pair of bits both of the other logic level comprising;

- pulse forming means responsive to the input bit stream for developing a transition pulse train containing pulses corresponding to the transition in said input bit stream;
- shift register means containing *n* serially connected stages, the input to stage 1 being said other logic level;
- means responsive to a pulse in said transition pulse train occurring at the boundary of a bit cell for setting stages 1 and 2 of said register means to said one logic level;
- means for enabling said logic gate means in sequence with the number of logic gate means enabled depending on the number of bit cells between pulses in said transition pulse train and for simultaneously disabling said logic gate means after each pulse in said transition pulse train;
- logic gate means connected with stages 3.4.5.6 . . . *n*, the logic gate means connected with stages 4.6 . . . *n* when enabled being responsive to a pulse in said transition pulse train occurring at the boundary of a bit cell for setting stages 4.6 . . . *n* to said one logic level;
- the logic gate means connected with stages 3.5 . . . *n*–1 when enabled being responsive to a pulse in said transition pulse train occurring between the boundaries of a bit cell for setting stages 3.5 . . . *n*–1 to said one logic level.

5. Apparatus for constructing a non-return-to-zero output bit stream from an input bit stream containing transitions which occur substantially at the boundary of the bit cells to represent a pair of "1's" and between the boundaries of the bit cells to represent a pair of "0's" comprising;

- means responsive to said input bit stream for developing a transition pulse train containing pulses corresponding to the transitions in said input bit stream;
- clock means for developing first and second timing pulse trains containing pulses occurring at substantially the boundaries of a bit cell and between the boundaries of a bit cell respectively;
- first and second logic gate means responsive to said transition pulse train and enabled by said first and second timing pulse trains respectively for producing first and second pulse trains containing pulses representing a pair of "1's" and a pair of "0's" respectively in said input bit stream;
- first shift register means containing *n* serially connected stages clocked by said first timing pulse train, the input to stage 1 of said first register means being a logic "0";
- third logic gate means connected with stages 3, 4, 5, 6 . . . *n* of said first shift register means;

second shift register means clocked by said first timing pulse train for counting the number of bit cells in said input bit stream and for enabling said third logic gate means in sequence with the number of logic gate means enabled depending on the number of bit cells counted;

the third logic means connected with stages 4.6 . . . $n$ when enabled being responsive to said first pulse train for setting stages 4.6 . . . $n$ of said first register means to a logic "1", the third logic means connected with stages 3.5 . . . n−1 when enabled being responsive to said second pulse train for setting stages 3.5 . . . $n-1$ of said first register means to a logic "1".

6. A method of converting an input bit stream wherein the data content is contained in the time of state change relative to bit time to an output bit stream wherein the data content is contained in the level of the bit stream comprising the steps of:

1. testing the state changes in the input bit stream relative to bit time, and if a state change occurs at a first time relative to bit time registering a pair of "1's" and if at a second time relative to bit time registering a pair of "0's",
2. repeating step (1) for each succeeding state change while counting the bit time interval between successive state changes in said input bit stream, 3. registering an alternate bit pattern between successive non-adjacent pairs registered so that the level of the bit adjacent the second of two non-adjacent pairs is opposite to the level of the second pair.

7. Apparatus for converting an input bit stream wherein the data content is contained in the time of state change relative to bit time to an output bit stream wherein the data content is contained in the level of the bit stream comprising:

means for detecting whether state changes in said input bit stream occur at a first or second time relative to bit time, means for detecting the elapsed bit time between successive state changes in said input bit stream, register means for registering a pair of "1's" if a state change occurs at said first time and a pair of "0's" if a state change occurs at a second time, and for registering an alternate bit pattern between successive non-adjacent pairs of bits with the level of the bit adjacent the second of two successive non-adjacent pairs being opposite to the level of the second pair and with the length of the alternate bit pattern depending on the elapsed time detected between successive state changes in said input bit stream.

* * * * *